US 12,522,518 B2

(12) United States Patent
Utsunomiya et al.

(10) Patent No.: US 12,522,518 B2
(45) Date of Patent: Jan. 13, 2026

(54) HEADRACE SYSTEM

(71) Applicant: UTSUNOMIYA KOGYO CO., LTD., Tokyo (JP)

(72) Inventors: Hideo Utsunomiya, Tokyo (JP); Hisao Kumazawa, Tokyo (JP)

(73) Assignee: UTSUNOMIYA KOGYO CO., LTD., Tokyo (JP)

( * ) Notice: Subject to any disclaimer, the term of this patent is extended or adjusted under 35 U.S.C. 154(b) by 464 days.

(21) Appl. No.: 18/008,552

(22) PCT Filed: Jul. 9, 2021

(86) PCT No.: PCT/JP2021/025907
§ 371 (c)(1),
(2) Date: Dec. 6, 2022

(87) PCT Pub. No.: WO2022/059308
PCT Pub. Date: Mar. 24, 2022

(65) Prior Publication Data
US 2023/0212035 A1    Jul. 6, 2023

(30) Foreign Application Priority Data

Sep. 17, 2020   (JP) ................................. 2020-156599
Nov. 6, 2020    (JP) ................................. 2020-185516

(51) Int. Cl.
*C02F 1/24*      (2023.01)
*B01D 21/00*     (2006.01)
(Continued)

(52) U.S. Cl.
CPC ............ *C02F 1/24* (2013.01); *B01D 21/0087* (2013.01); *B01D 21/06* (2013.01);
(Continued)

(58) Field of Classification Search
CPC ............ B01D 21/2433; B01D 21/2438; B01D 21/0084; B01D 21/0087; B01D 21/06;
(Continued)

(56) References Cited

U.S. PATENT DOCUMENTS 2,713,026 A    7/1955   Kelly et al.
5,658,461 A    8/1997   Marsh
(Continued)

FOREIGN PATENT DOCUMENTS

EP    2213624 A1      8/2010
JP    H06-262167 A    9/1994
(Continued)

OTHER PUBLICATIONS

International Search Report dated Sep. 7, 2021, issued by the International Searching Authority in related International Application No. PCT/JP2021/025907.
(Continued)

Primary Examiner — Claire A Norris
(74) Attorney, Agent, or Firm — ArentFox Schiff LLP

(57) ABSTRACT

A headrace system 1 improving a scum generation function of the headrace distributing and supplying raw water to a sedimentation basin provided in a sewage treatment plant to contribute to energy savings in the sewage treatment plant as a whole and contribute to solving environmental problems, which is provided with a buoyant imparting means 20 configured with including an ejector 22, in a side in which the raw water of a headrace body 2 to which the raw water is supplied or in the raw water flowed into the headrace 2 to impart buoyant force to solid matters contained in the raw
(Continued)

water, and scum removing means 4, 8, 9, 10, 40*a*, and 40*b* removing scum S floating on a water surface of the headrace body 2.

6 Claims, 9 Drawing Sheets

(51) Int. Cl.
  *B01D 21/06* (2006.01)
  *B01D 21/24* (2006.01)
  *E03F 5/14* (2006.01)
(52) U.S. Cl.
  CPC ..... *B01D 21/2405* (2013.01); *B01D 21/2438* (2013.01); *E03F 5/14* (2013.01)
(58) Field of Classification Search
  CPC .... B01D 21/04; B01D 21/12; B01D 21/2405; C02F 1/24; E03F 5/14
  USPC .............................. 210/525, 221.1, 776, 703
  See application file for complete search history.

(56) References Cited

U.S. PATENT DOCUMENTS

| | | | | |
|---|---|---|---|---|
| 5,766,484 A | * | 6/1998 | Petit | ..................... B03D 1/1493 |
| | | | | 210/221.2 |
| 2010/0236999 A1 | * | 9/2010 | Utsunomiya | .......... B01D 21/34 |
| | | | | 210/207 |

FOREIGN PATENT DOCUMENTS

| | | |
|---|---|---|
| JP | H08-71550 A | 3/1996 |
| JP | 2003-170163 A | 6/2003 |
| JP | 2011-088048 A | 5/2011 |
| JP | 2011-240271 A | 12/2011 |
| JP | 5663188 B2 | 2/2015 |
| JP | 2018-051461 A | 4/2018 |

OTHER PUBLICATIONS

Extended European Search Report, issued by the European Patent Office in corresponding European Application No. 21868995, dated Aug. 8, 2024.

\* cited by examiner

HEADRACE SYSTEM

BACKGROUND OF THE INVENTION

Technical Field

The present invention relates to a headrace system for distributing and supplying raw water to a primary sedimentation basin installed in a sewage-treatment plant.

The present application is a National Stage entry of the International Application No. PCT/JP2021/025907, filed Jul. 9, 2021, which claims priority to Japanese Patent Application No. 2020-156599, filed Sep. 17, 2020, and Japanese Patent Application No. 2020-185516, filed Nov. 6, 2020. The disclosures of the priority applications are incorporated in their entirety by reference herein.

Background Art

In a sewage-treatment plant, as shown in FIG. 1 of Patent Literature 1, a plurality of sedimentation basins (primary sedimentation basins (or sometimes called first sedimentation basins) are arranged to be lined up; raw water is distributed and supplied from one headrace (inlet conduit) to each of the sedimentation basins. In the raw water supplied to the headrace, since the raw water is waste water, buoyant substances other than settleable substances which are objects for treating in the sedimentation basins are contained. The buoyant substances are gathered in a certain size and generate scum.

When the raw water is supplied to the conduit and time passes, the scum floats on the water surface of the conduit, and the floating scum gradually increases in thickness to generate a scum layer. When the thickness of the generated scum layer reaches, for example, about 10 cm, the scum is removed. The removal of the scum is carried out by discharging scum to a scum pit (discharge pit) provided on the opposite side to the side to which the raw water is supplied to the headrace. The removal of scum shown in Patent Literature 1 is carried out by opening a movable gate provided between the headrace and the scum pit and flowing a surface water including a scum layer in the headrace into the scum pit.

CITATION LIST

Patent Literature

[Patent Literature 1] Japanese Patent No. 5663188

SUMMARY OF INVENTION

Technical Problem

The present applicant has obtained knowledge that to remove scum in a headrace leads to reduce a load of a subsequent treatment device such as a sedimentation basin, a reaction chamber (aeration tank) and the like, from the experience in being concerned with removal of scum in a headrace for a long time. From the knowledge, a knowledge has come that the headrace has a function of distributing and supplying the raw water to the sedimentation basin but also contributes to save energy in the overall sewage-treatment plant as a result of performing more scum in the headrace to reduce the load of the subsequent treatment device. Moreover, a knowledge that modern problems of microplastics can be handled has come to be obtained. Moreover, since microplastics derived from chemical fibers and the like occur and flow into the headrace during general household laundering, it has also been found that such microplastics can also be removed in the headrace to deal with modern problems.

Therefore, an object of the present invention is to provide a headrace system that can help to reduce energy in overall of the sewage-treatment plant and contribute an environmental problem.

Solution to Problem

A headrace system according to the present invention is a headrace system supplying raw water to a sedimentation basin provided in a sewage-treatment plant, and is provided with a buoyancy imparting means provided at a side to which raw water of a headrace body to which raw water is flowed in is flowed in, or before flowing into the headrace body, to impart buoyancy to solid matters included in the raw water, and a scum removing means that removes scum floating on a water surface of the headrace body from the headrace body and discharges to a scum pit arranged continuously to the headrace body.

In the headrace system of the present invention, the buoyant imparting means preferably supplies minute bubbles to the raw water.

In the headrace system of the present invention, the supply of the minute bubbles to the raw water is performed by generating water in which air is mixed through an ejector or a stationary mixer and supplying the air-mixed water.

In the headrace system of the present invention, it is preferable that the scum removing means be provided inside a side wall along a longitudinal direction of the headrace body into which the raw water flows and at a position below a scum layer generated in the headrace body along the longitudinal direction of the headrace body, and have a compressed-air jetting mechanism that jets compressed air from a plurality of portions in the longitudinal direction.

In the headrace system of the present invention, it is preferable to have an over-water nozzle jetting pressure water to an upper surface of the scum layer to advance a flow so that the scum layer goes toward the scum pit.

In the headrace system of the present invention, it is preferable that an underwater nozzle be provided to jet pressure water in water to advance a flow so that the scum layer goes toward the scum pit.

In the headrace system of the present invention, it is preferable that the scum removing means have a rake mechanism gathering scum and discharging to the scum pit.

Advantageous Effects of Invention

The headrace system of the present invention is provided with a buoyant imparting means that imparts buoyancy to solid matters included in the raw water and a scum removing means that removes scum floating on a water surface of the headrace body, so that more scum can be removed in the headrace body. That is, the headrace system of the present invention can utilize the headrace not only to supply the raw water to the sedimentation basin but also as a pretreatment device in installations such as a subsequent sedimentation basin and a reaction chamber and can reduce a load of these subsequent installations; as a result, it is possible to contribute to reduce energy the overall sewage-treatment plant and contribute environment problems.

DESCRIPTION OF EMBODIMENTS

Figure 1:
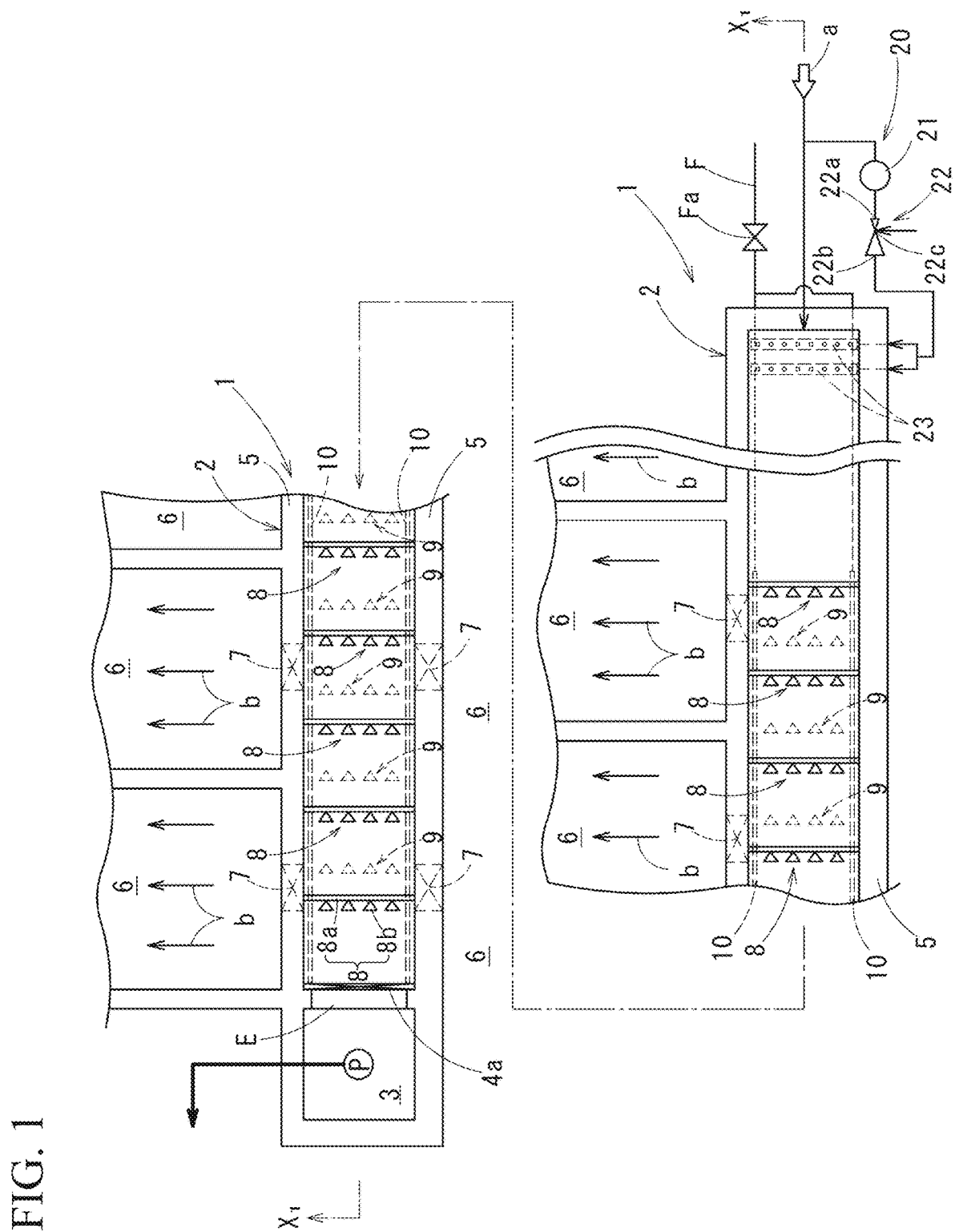
FIG. 1 It is a plan view of a headrace system according to the present invention.

A headrace system 1 is provided with a headrace body 2, a scum pit 3 and a buoyant imparting means 20. The buoyant imparting means 20 will be described in detail after an explanation of the scum pit 3 connected to the headrace body 2 and a sedimentation basin 6.

The headrace body 2 exhibits a long waterway of an upper-opened type; one end side (right-end side in the illustrated example) of a longitudinal direction thereof is supplied raw water composed of waste water (refer to an arrow "a").

The scum pit 3 is provided to be adjacent to a terminal end side (left-end side in the illustrated example) of a flow direction of the raw water of the headrace body 2; a part of the wall forming the scum pit 3 is also a wall forming the terminal end side of the headrace body 2 (the wall is denoted by a symbol E). A height of an upper surface Ea of the wall E is lower than the water surface in the headrace body 2 (refer to FIG. 2). At a side of the headrace body 2 of the wall E, a movable gate 4 forming a part of the scum removing means of the present invention is provided. The movable gate 4 can control the raw water flowing into the scum pit 3 from the headrace body 2.

Figure 2:
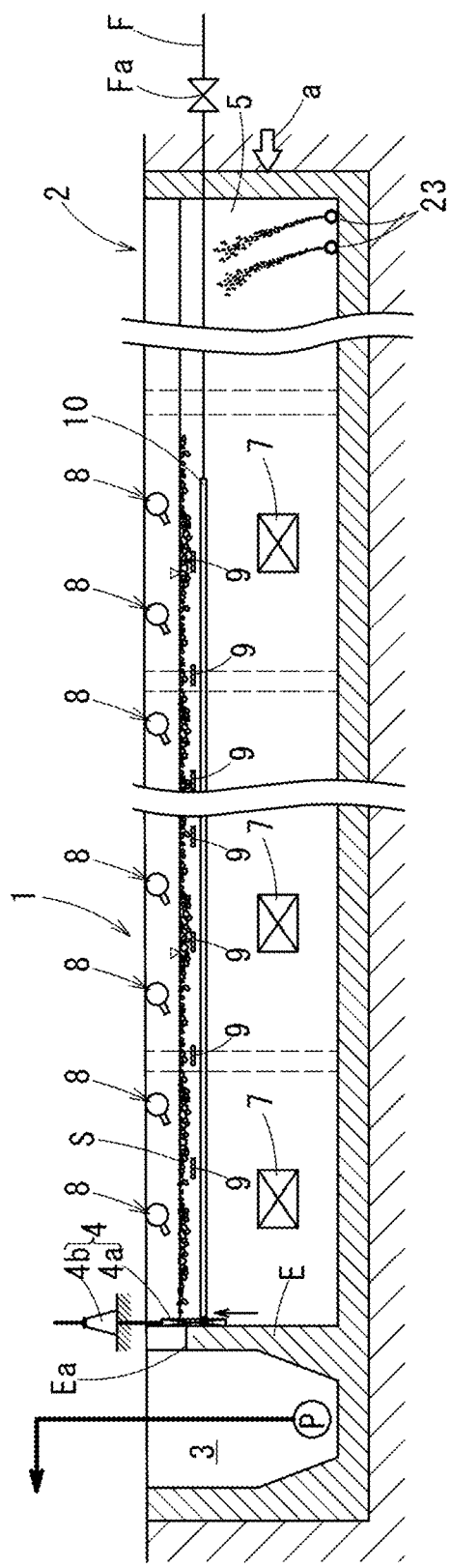
FIG. 2 It is a cross-sectional view taken along the line $X_1$-$X_1$ in FIG. 1.
Figure 3:
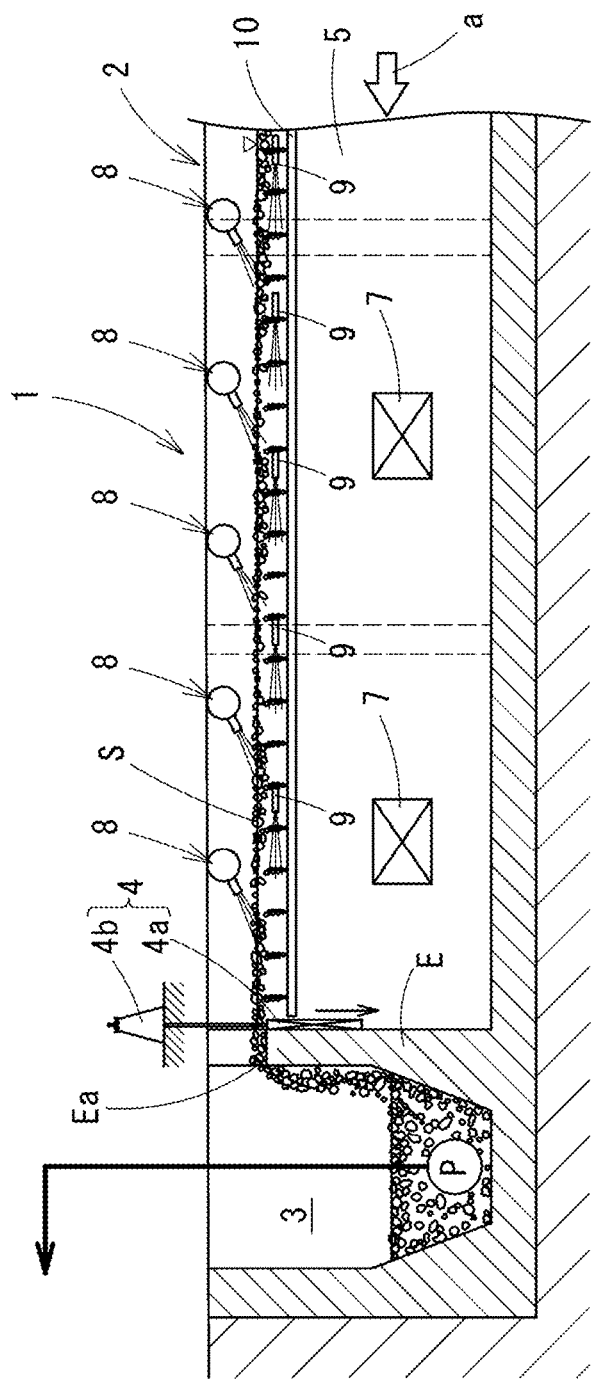
FIG. 3 It is a partially-enlarged view explaining a state of the headrace system in FIG. 2 when scum is removed.
Figure 4:
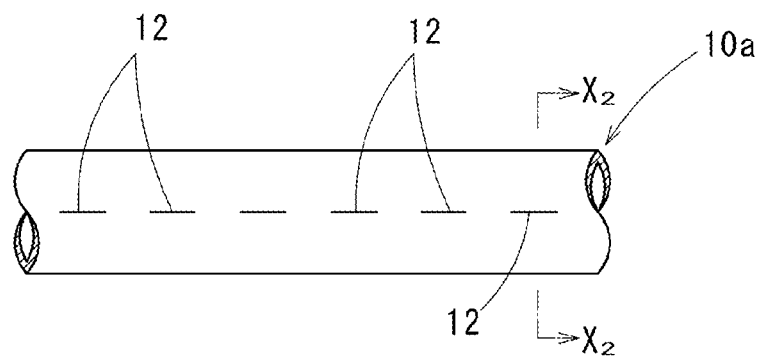
FIG. 4 It is a frontal view of a part of a compressed-air jetting mechanism used in the headrace.

The movable gate 4 is provided with a gate plate 4a and a driving mechanism 4b (refer to FIG. 2) omitted in FIG. 1; when scum S is not discharged from the headrace body 2 into the scum pit 3, the gate plate 4a cuts off between an inside of the headrace body 2 and the scum pit 3 as shown in FIG. 2; and when the scum S is discharged from the headrace body 2 into the scum S, the cut-off state by the gate plate 4a is cancelled as shown in FIG. 3. Accordingly, when the movable gate 4 is opened as shown in FIG. 3, a surface-layer water in the headrace body 2, i.e., the raw water containing the scum S can be discharged into the scum pit 3.

A width of the gate plate 4a is slightly smaller than a waterway width of the headrace body 2; and a height thereof is sufficiently larger than a difference between a position of the upper surface Ea of the wall E and the water surface position in the headrace body 2. A known vertical moving mechanism such as a system of a screw rod and a rotary nut, a system of rack-and-pinion, and the like is used for the driving mechanism 4b to move the gate plate 4a vertically.

Accordingly, when the scum S is not discharged, the driving mechanism 4b moves the gate plate 4a upward so that an upper end position of the gate plate 4a is sufficiently higher than the water surface position in the headrace body 2 as shown in FIG. 2 (in this state, a lower end of the gate plate 4a is disposed below the upper surface Ea of the wall E); and when the scum S is discharged, as shown in FIG. 3, the driving mechanism 4b moves the gate plate 4a downward so that the upper end position of the gate plate 4a is lower than the water surface position in the headrace body 2 and also slightly below than a bottom surface position of the scum layer S generated in the headrace body 2. As a result, the scum layer S in the headrace body 2 passes above the gate plate 4a and the wall E and flows out to the scum pit 3.

On the outside of one side wall 5 in the longitudinal direction of the long waterway forming the headrace body 2, a plurality of sedimentation basin 6 corresponding to primary sedimentation basins of the sewage treatment plant are disposed side by side. A part of side walls of the sedimentation basins 6 is also used as the side walls 5 of the headrace body 2. Inflow ports 7 on which an open/shut door (not illustrated) is attached on substantially a middle height position of the side walls 5 are provided. Accordingly, it is configured to communicate the inside of the headrace body 2 and the inside of the sedimentation basins 6 through the inflow ports 7. As a result, when the open-shut doors of the inflow ports 7 are opened, the raw water in the conduit body 2 flows into the sedimentation basins 6, and the raw water which flows in can flow in a direction leaving from the side walls 5 in the sedimentation basins 6 (refer to the arrow "b" in FIG. 1). In addition, although the sedimentation basins 6 are arranged outside of one of the side walls 5 of the headrace body 2 in the illustrated example, they may be arranged outside of both side walls 5.

On the headrace body 2, a plurality of over-water nozzles 8 having a water supply tube 8a and a nozzle part 8b forming a part of the scum removing means of the present invention are provided. The over-water nozzles 8 are provided slightly upper than the water surface in the headrace body 2 with predetermined intervals along the water flow direction in the headrace body 2.

The water supply tubes 8a of the over-water nozzles 8 are provided between the side walls 5 of the headrace body 2 facing to each other orthogonally to the longitudinal direction of the conduit body. In other words, the water supply tubes 8a are provided along the orthogonal direction to the flow direction of the headrace body 2. These water supply tubes 8a are disposed at substantially a same height position above the water surface of the headrace body 2 in parallel to each other. To the water supply tubes 8a, water with a predetermined pressure is supplied via a pump which is not illustrated. In addition, for the water supplied to the water supply tubes 8a, treated water of the sewage treatment plant can be used.

The nozzles 8b are provided with predetermined intervals in the longitudinal direction of the water supply tube 8a to direct diagonally downward so that a tip-end opening thereof directs downward at a downstream side of the flow of the water in the headrace body 2. Accordingly, when pressure water is supplied to the water supply tubes 8a, jetting water is supplied from the nozzles 8b onto the scum S piled on the water surface of the headrace body 2, and the flow of the scum S that tends to flow toward the scum pit 3 can be promoted (refer to FIG. 3). In the present invention, the scum S which grows up to a certain thickness on the water surface may be called as "scum layer S".

Moreover, in the headrace body 2, underwater nozzles 9 forming a part of the scum removing means of the present invention are provided. The underwater nozzles 9 are provided in the water slightly under the water surface in the headrace body 2 (position below the scum layer S) with predetermined intervals with each other in the flow direction of the water in the headrace body 2. A plurality (four in the illustrated example) of the underwater nozzles 9 are provided also along a waterway width, with predetermined intervals with each other. That is, rows of the plurality of the underwater nozzles 9 arranged in rows along the waterway width direction (direction orthogonal to the flow direction of the headrace body 2) are arranged with predetermined intervals along the flow direction of the headrace body 2. An opening part of the underwater nozzles 9 is provided toward the scum pit 3 side.

The underwater nozzles 9 are held by a pressure water supply pipe which is not illustrated. For example, for the underwater nozzles 9, a jetting nozzle for a scum removal device suggested in Japanese Patent No. 5443260 and Japanese Patent Application No. 2019-150022 by the present applicant can be applied. Accordingly, as in these suggested nozzles, the underwater nozzles 9 jet out the pressure water substantially horizontally from the opening part which opens toward the scum pit 3 side when the pressure water is supplied to the underwater nozzles 9 from the pressure water supply pipes to promote the flow of the scum S that tends to flow toward the scum pit 3 (refer to FIG. 3). On the underwater nozzles 9, as in the nozzles suggested above, a closing member which is opened by power of the pressure water and closes the opening part when the supply of the pressure water is stopped is provided, thereby having characteristic preventing damages and stains of the inside of the underwater nozzles 9. Moreover, for the water supplied to the underwater nozzles 9, treated water of the sewage treatment plant can be used.

Furthermore, in the headrace body 2, jetting mechanisms 10 forming a part of the scum removing means of the present invention are provided. The jetting mechanisms 10 have a rod shape as a whole, and are provided inside both side walls 5 of the headrace body 2 via a support device which is not illustrated (refer to FIG. 1 to FIG. 3). The installation position of the jetting mechanisms 10 is determined to be below the scum layer S generated in the headrace body 2. For example, when the scum S stays by driving the headrace system 1 and grows nearly 10 cm in the thickness, in a case in which the scum S is discharged from the headrace body 2 into the scum pit 3, the jetting mechanisms 10 are installed to be slightly lower than 10 cm from the water surface. The installation position of the jetting mechanisms 10 is different in accordance with the sewage treatment plant where the headrace body 2 is installed; however, in any case, it is determined to below the generated scum layer S.

As the jetting mechanisms 10, pipes made of elastic material such as natural rubber or synthetic rubber with a plurality of slits, pipes made of steel with a plurality of holes can be applied, and further, it may be applied so that the holes face downward and an outlet member having a cup shape is attached to the holes in order to prevent clogs.

Among them, the jetting mechanism in which the plurality of slits are provided in the pipe made of the elastic material is a simple structure, and will be explained. The jetting mechanisms 10 have pipes 11 in which a circumference wall is made of elastic material such as natural rubber, synthetic rubber or the like in which a plurality of slits 12 are formed to penetrate the circumference wall of the pipe 11. The pipes 11 are installed in water, and the pipes 11 are connected to a compressed-air supply system F that can supply compressed air with higher pressure than pressure in the water where the pipes 11 are installed.

The pipes 11 are provided inside both side walls 5 of the headrace body 2 along the side walls 5, so that one end side is closed by a closing member that is not illustrated. The other end side is connected to the compressed-air supply system F via an open-close valve Fa; when the open-close valve F is open, air is supplied with predetermined pressure into the pipes 11.

The slits 12 of the pipes 11 are provided so that a longitudinal direction of the slits 12 is parallel to a longitudinal direction of the pipes 11 with predetermined intervals to each other in the longitudinal direction. Furthermore, the arrangement state of the slits 12 can be provided so that the longitudinal direction of the slits 12 coincides with the longitudinal direction of the pipes 11 and the slits 12 form two rows along the longitudinal direction of the pipes 11. In a case in which the slits 12 are provided in a plurality of rows, it is preferable that the slits 12 of the rows are arranged alternately not to overlap with each other in a circumference direction of the pipes 11.

Figure 5:
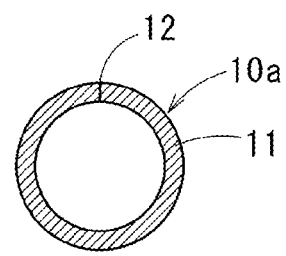
FIG. 5 It is a cross-sectional view of $X_2$-$X_2$ in FIG. 4, showing a state in which compressed air is not supplied.
Figure 6:
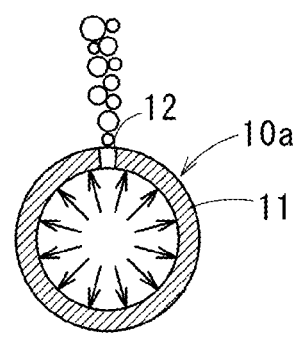
FIG. 6 It is a cross-sectional view of $X_2$-$X_2$ in FIG. 4, showing a state in which compressed air is supplied.

The slits 12 of the pipes 11 are closed as shown in FIG. 5 when the compressed air is not supplied to the pipes 11 and the pressure in the pipes 11 is equal to or smaller than the water pressure; when the compressed air is supplied to the pipes 11 from the compressed-air supply system F, the slits 12 are open as shown in FIG. 6; and the compressed air is discharged into the raw water as bubbles. The bubbles that are emitted out go upward along a surface of the side walls 5 and can tear off the scum layer S adhered to the side walls 5 from the surface of the side walls 5.

Next, the buoyant imparting means 20 forming a characteristic component of the present invention will be described. The buoyant imparting means 20 is provided with a pump 21, an ejector 22, and a perforated pipe 23 as shown in FIG. 1 to supply water in which air is mixed generated by the ejector 22 into the headrace body 2 from the perforated pipe 23 into the headrace body 2.

The pump 21 is a known pump and takes a part of the raw water (sewage water) to supply it to a drive port 22a of the ejector 22. In addition, it is applicable that the pump 21 supplies water of the sewage treatment plant such as treated water of the sedimentation basin 6 and the like, or water such as water for factory to the drive port 22a of the ejector 22.

The ejector 22 is a known ejector and sucks air from a suction port 22c when drive water that is supplied to the drive port 22a from the pump 21 is discharged from a discharge port 22b with high pressure. That is, the ejector 22 can mix the air sucked from the suction port 22c into the raw water with melting a part to discharge from the discharge port 22b. In addition, the air sucked from the suction port 22c can be the compressed air existing plentifully in the sewage treatment plant. In this case, the air can be mixed into the raw water with melting a part efficiently. Moreover, although it is not illustrated, a non-return valve as a safety equipment and a regulator valve for controlling an amount of suction air are provided at a middle of a pipe connected to the suction port 22c of the ejector 22.

The perforated pipe 23 has a structure in which a plurality of holes are provided in a rod-shape pipe and provided on a bottom part of the headrace body 2 at a side of the raw water flows in along a direction perpendicular to a flow direction of the raw water. In the example shown in FIG. 1 and FIG. 2, two perforated pipe 23 are provided to be horizontally arranged (with an interval in the flow direction of the raw water); however, it may be one, or three or more.

Figure 7:
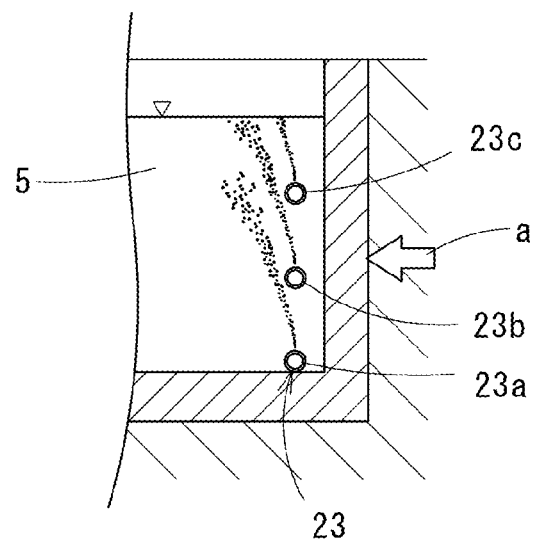
FIG. 7 It is a structure view of another style of arrangement of a perforated pipe.

The perforated pipes 23 may be provided as shown in FIG. 7 to be arranged with an interval in a vertical direction (depth direction) at different depth positions in the headrace body 2. In the example of FIG. 7, the perforated pipes 23 are provided at respective positions where the water depth is divided into three: a perforated pipe 23a is disposed at the bottom, a perforated pipe 23b is disposed above the perforated pipe 23a, and a perforated pipe 23c is disposed above the perforated pipe 23b. As FIG. 7, in a case in which the perforated pipes 23 are arranged with intervals in the vertical direction, water (air-mixed water) discharged from the perforated pipes 23 can be supplied without delay evenly around a whole area of the raw water in the headrace body 2 in the depth direction.

In addition, in the illustrated example, in order to simplify the drawing, the perforated pipes 23 are provided near the sedimentation basin 6 at the inflow side (right side) of the headrace body 2; however, the actual installation position of the perforated pipes 23 is decided from a time for the bubbles discharged from the perforated pipes 23 going up to the water surface, a flow speed of the raw water in the headrace body 2 and the like. Accordingly, the perforated pipes 23 can be provided also in the waterway supplying the raw water to the headrace body 2 without being provided in the headrace body 2. For example, the perforated pipes 23 can be provided also in the vicinity of an exit of a settling basin of the sewage treatment plant. In this case, the pump 21 and the ejector 22 or a stationary mixer 30 stated below are provided in the vicinity of the exit of the settling basin.

In any way, the actual installation position of the perforated pipes 23 is decided so that when the bubbles of the air-mixed water discharged from the perforated pipes 23 go up to the water surface, the rose bubbles reaches near the sedimentation basin 6 at the inflow side (right side). In so doing, suspended solids in the raw water can be floated by adding buoyant force before the raw water flowing in the headrace body 2 flows into the sedimentation basin 6. Needless to say, the installation position is not necessarily strict, but sufficient to be rough. Because it is not necessary to add the buoyant force to all of the suspended solids in the raw water since it is also treated in the sedimentation basin 6 after the headrace body 2.

In the buoyant imparting means 20 of the above-described structure, when a part of the raw water is discharged via the ejector 22 from the perforated pipes 23 provided in the headrace body 2, the air that is mixed/melted in the discharged water becomes minute bubbles and emitted into the raw water of the headrace body 2. Accordingly, the minute bubbles adhere to the suspended solids including microplastics in the raw water and rise in the raw water to improve the buoyant of the suspended solids and contribute to generate the scum S.

In addition, since it is not necessary for the buoyant imparting means 20 according to the present invention to float all of the suspended solids in the raw water, there is an advantage of carrying out without a pressure tank in which pressure water is stored to between the ejector 22 and the perforated pipes 23, such as known pressure flotation separation equipment (that generates pressure water by pressuring air and water to melt the air into a supersaturated state, and then releases it to the atmospheric pressure, so that a large amount of minute bubbles are generated in the water and adhered to the suspended matters in the water, as a result, the suspended matters are floated to the water surface to be separated). Needless to say, the pressure tank can be installed, and it is also possible to contrive to elongate a pipeline length connecting the ejector 22 and the perforated pipes 23 in order to improve the dissolution of air into the water.

As another example of the buoyant imparting means 20 according to the present invention, for example, a known stationary mixer shown in Japanese Patent Gazette No. 4921127 can be used. In the stationary mixer, a plurality of resistors are disposed in a flow channel inside a cylindrical casing, the plurality of the resistors are provided to be protruded in a plate shape from an inner peripheral surface side toward the center portion respectively, with predetermined intervals in an axial direction in order not to be in contact with each other in a state inclined to the downstream, and shifted in a circumferential direction with a predetermined angle. In the stationary mixer of this type, when liquid and gas are supplied in the casing, the mixed fluid of the liquid and the gas is affected by separation, conversion, inversion, and the like by the resistors, stirred hard and becomes turbulence; as a result, the bubbles are finely crushed and liquid including minute bubbles with high density is generated.

Figure 8:
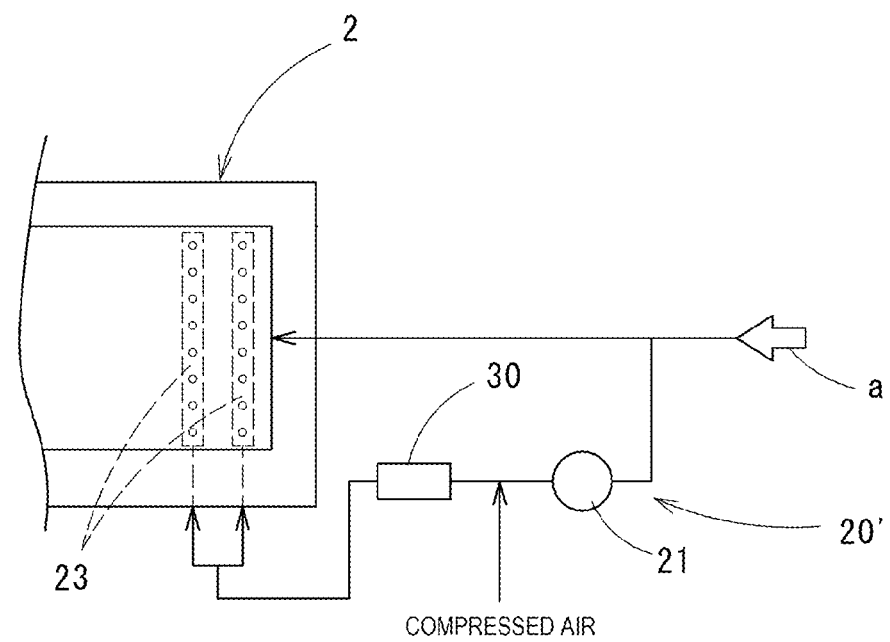
FIG. 8 It is a structure view of another style of a buoyant imparting means.

FIG. 8 shows a buoyant imparting means 20' using the above-described stationary mixer. The buoyant imparting means 20' is structured by arranging the stationary mixer 30 instead of the above-described ejector 22 in FIG. 1; by supplying compressed air with a predetermined pressure between the flow paths of the pump 21 and the stationary mixer 30, the stationary mixer 30 mixes the air and the water.

Even when the buoyant imparting means 20' is used, similarly to when the ejector 22 is used, when water (air-mixed water) is discharged from the perforated pipes 23, the air that is mixed and melted into the discharged water becomes minute bubbles and emitted into the raw water of the headrace body 2. Accordingly, the minute bubbles adhere to the suspended solids including microplastics while going up in the raw water to improve the buoyant force of the suspended solids, and it is possible to contribute to generate the scum S.

Figure 9:
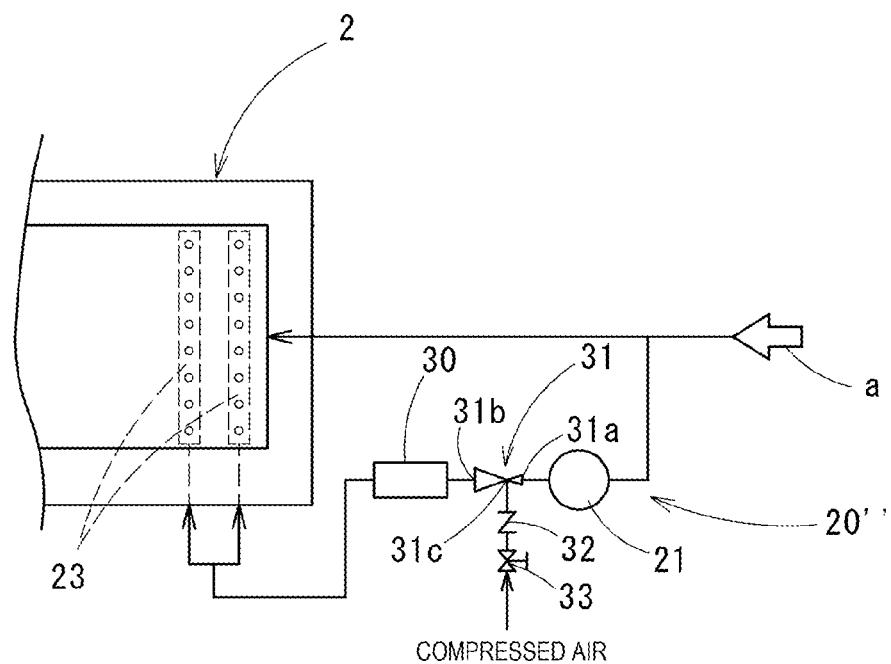
FIG. 9 It is a structure view of yet another style of the buoyant imparting means.

FIG. 9 shows another buoyant imparting means 20" using the stationary mixer 30. That is to say, the buoyant imparting means 20" employs a configuration in which an ejector 31 is arranged between the flow paths of the pump 21 and the stationary mixer 30.

The ejector 31 of the buoyant imparting means 20" is a known ejector and is configured so that when drive water supplied from the pump 21 to a drive port 31a is discharged from a discharge port 31b at high pressure, it is possible to suck air from a suck port 31c and discharge from the discharge port 31b with mixing the sucked air and melting a part of the sucked air in the raw water. Moreover, on the middle of the pipe connected to the suck port 31c of the ejector 31, a check valve 32 as safety equipment and a regulator valve 33 for controlling a suction volume of the air are provided.

The buoyant imparting means 20" having the ejector 31 does not need a compressed air source, so that an air supplier such as a compressor and a blower and a driving source of the air supplier are not necessary, and there is an advantage of reducing costs of equipment and driving. Moreover, since the ejector 31 is used, gas-liquid mixed water can be supplied from the ejector 31 to the stationary mixer 30. Accordingly, it is possible to supply water including further minute bubbles from the stationary mixer 30 to the perforated pipes 23. In addition, the compressed air can be supplied to the stationary mixer 30 shown in FIG. 9 to FIG.

12 which are described below can be the same ejector type as this buoyant imparting means 20".

In addition, as the buoyant imparting means 20 according to the present invention, in addition to the above-described, for example, it may be a case in which bubbles generated by a known micro-bubble generator are supplied into the raw water, for example, shown by Japanese Unexamined Patent Application, First Publication No. 2008-207099, Japanese Unexamined Patent Application, First Publication No. 2003-230824, and the like.

Moreover, The buoyant imparting means 20 according to the present invention includes also a case of chemically generating the minute bubbles. For example, bubbles emitted from a foaming agent mainly containing sodium hydrogen carbonate are included.

Next, a discharging operation of scum by the headrace system 1 of above-described configuration will be described.

As shown by the arrow "a" in FIG. 1 and FIG. 2, when the raw water (sewage water) flows into the headrace system 1, the air which is mixed and melted in the water discharged from the perforated pipes 23 of the buoyant imparting means 20 becomes minute bubbles and is emitted into the raw water of the headrace body 2. Accordingly, the minute bubbles adhere to the suspended solids in the raw water while going up in the raw water to improve the buoyant force of the suspended solids and promote generation of the scum S. It is the same also in a case in which the above-described micro-bubble generator of the buoyant imparting means 20' and 20" are used instead of the buoyant imparting means 20 and a case in which the minute bubbles chemically generated are emitted into the raw water.

The raw water in the headrace body 2 flows into the respective sedimentation basins 6 from the inflow ports 7; in the sedimentation basins 6, predetermined sedimentation treatment is performed (refer to FIG. 1). At this time, the movable gate 4 is closed (refer to FIG. 2). By closing the movable gate 4, the scum S gradually gathers on the water surface of the headrace body 2.

In addition, in the raw water flowed into the respective sedimentation basins 6 from the inflow port 7, the suspended solids to which the buoyant force is imparted by the buoyant imparting means 20 (20' and 20") go up in the sedimentation basins 6 to generate scum; and the scum generated in the sedimentation basins 6 can be efficiently removed by installing the scum removal device of Japanese Patent No. 3943551 that is proposed by the present applicant in the sedimentation basins 6. The patent device is put to practical use with a nickname "Shu-ichi Kun" (trade name); and there is an advantage of removing the scum with extremely small amount of accompanying water in comparison with ordinally scum removal devices.

When a predetermined time of the closing state of the movable gate 4 is passed, a thickness of the scum layer S reaches a predetermined thickness, for example, nearly 10 cm. When the thickness of the scum layer S reaches the predetermined thickness, the compressed air is supplied to the jetting mechanism 10 from the compressed-air supply system F. The supplied compressed-air is emitted into the raw water as bubbles. Then, the emitted bubbles go up along the surface of the side walls 5 and peel the scum layer S adhered to the side walls 5 off from the surface of the side walls 5.

At the same time when the compressed air is supplied to the jetting mechanism 10, pressure water is supplied to a water supply tube 8a of the over-water nozzle 8. Accordingly, jetting water is jetted from the nozzle part 8b toward the scum layer S on the water surface of the headrace body 2, diagonally downward as shown in FIG. 3, and the movement of the scum layer S to the scum pit 3 side is promoted. Moreover, when the pressure water is supplied to the underwater nozzle 9 from the pressure water supply pipe, the pressure water is jetted out from an open part which opens toward the scum pit 3 side, and the flow of the scum layer S flowing toward the scum pit 3 is promoted. Furthermore, the movable gate 4 is open at the same time as the pressure water is jetted out from the over-water nozzle 8 and the underwater nozzle 9, or before or after operation of them. As a result, the scum layer S on the water surface of the headrace body 2 moves from the headrace body 2 into the scum pit 3, and the discharge of scum is advanced (refer to FIG. 3). In addition, the supply of the pressure water to the water supply tube 8a and the opening of the movable gate 4 can be started in a state in which the peeling (peeling from the side walls 5) of the scum layer S by the jetting mechanism 10 advances to some degree.

When almost all the scum layer S moves from the water surface of the headrace body 2 into the scum pit 3, the supply of the compressed air to the jetting mechanism 10 is stopped and the supply of the pressure water to the water supply tube 8a of the over-water nozzle 8 and the underwater nozzle 9 is stopped, and the movable gate 4 is also closed, so that a series of the scum discharge operation ends (refer to FIG. 1). In addition, the scum S moved into the scum pit 3 is sent out to a scum treatment facility by an underwater pump P and treated.

In the above-described scum treatment, it is possible to carry out the supply and stop of the compressed air to the jetting mechanism 10, the supply and stop of pressure water to the over-water nozzle 8 (supply tube 8a) and the underwater nozzle 9, and the open and close the movable gate 4 by on/off by an operator automatically; however, it can be fully automated using a timer or detecting the thickness of the scum layer S.

In the above-described example, the pressure water is jetted out from both the over-water nozzle 8 and the underwater nozzle 9 to promote the flow of the scum; however, it can be either one of them. Moreover, it is possible to install both and choose appropriately. It is determined which nozzle is installed or both nozzles are installed in accordance with character of sewage water that flows into the headrace. In any case, when both nozzles are installed, it is possible to obtain the effect of discharging scum which is firmly grown.

Figure 10:
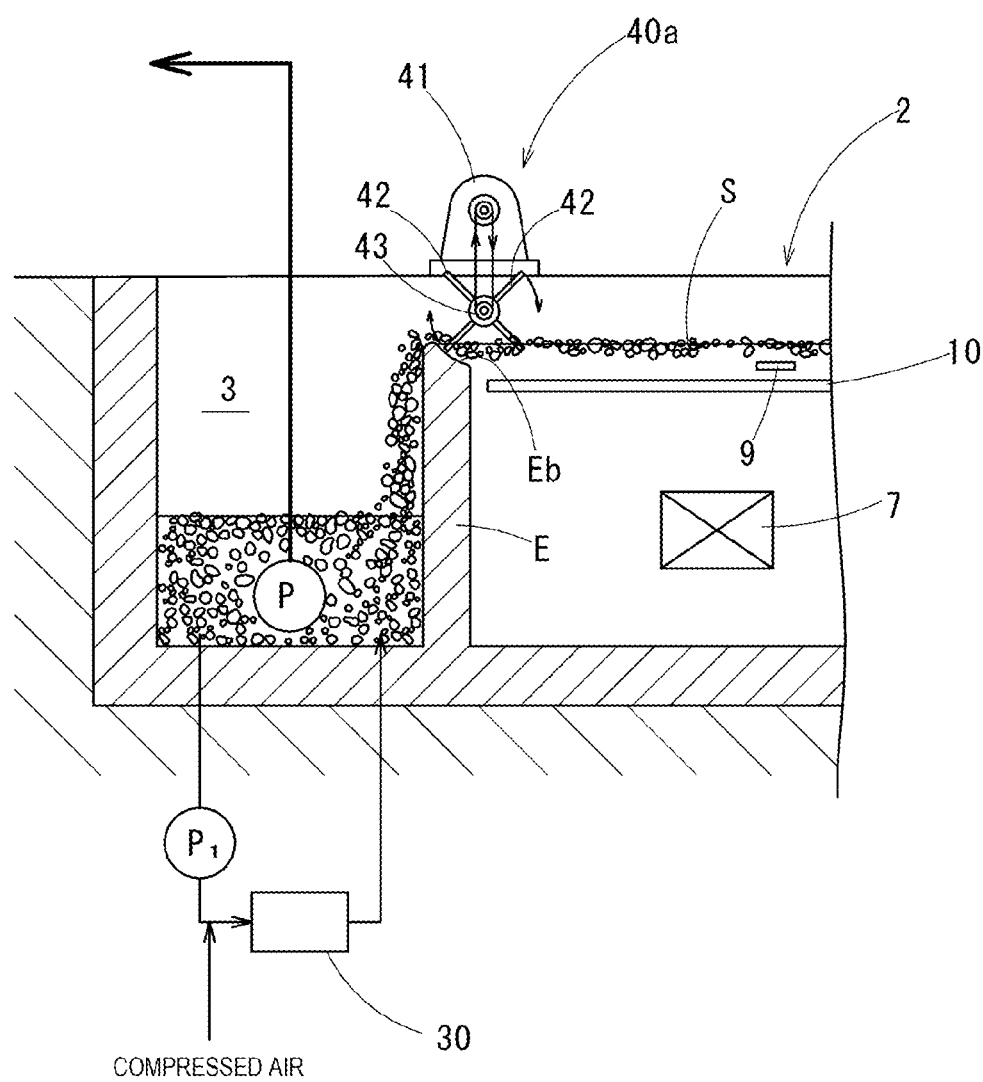
FIG. 10 It is a structure view of another style of a scum removing means.

In the headrace system according to the present invention, the minute bubbles are emitted from the buoyant imparting means 20 (20' and 20") into the raw water in the headrace body 2 and the buoyant force is imparted to the suspended solids in the raw water, so that a to large amount of the scum S is continuously generated; therefore, it is preferable to discharge by a rake mechanism. FIG. 10 shows an example in which the scum removing means is configured of a rake mechanism 40a.

At first, a highest position of an upper surface Eb of the wall E where the rake mechanism 40a is installed between the scum pit 3 adjacent to the headrace body 2 and the headrace body 2 is set to slightly higher than the water surface of the headrace body 2; the shape of the upper surface Eb at the headrace body 2 side set to slightly outside a rotation locus of a tip end of a blade described later of the rake mechanism 40a. Above the upper surface Eb, a motor 41 which is a drive source of the rake mechanism 40a and a rotation shaft 43 rotated by the motor 41 and having a plurality (four in the illustrated example) of blades 42 with equal interval on the periphery are provided. The rotation shaft 43 is provided between the side walls 5 of the headrace body 2 facing to each other so as to be orthogonal to the longitudinal direction (flow direction) of the headrace body 2. The blades 42 are arranged radially along a radius direction of the rotation shaft 43 and in a direction orthogonal to both side walls 5; the length (length along the longitudinal direction of the rotation shaft 43) is slightly smaller than distance between the side walls 5 of the headrace body 2 facing to each other; and a width of the blades 42 (wide along the radius direction of the rotation shaft 43) is decided so that the tip end position is arranged with a small gap to the upper surface Eb when it approaches the upper surface Eb, and furthermore, so that it reaches near the bottom surface of the scum layer S when it is disposed downward vertically. A thickness of the blades 42 is decided to have a sufficient strength to rake the scum S out.

The rake mechanism 40a made of the above-described configuration can discharge the scum S to the scum pit 3 with raking up the scum S to go over the upper surface Eb of the wall E when the blade 42 at the lower side is rotated to the scum pit 3 side (rotation in clockwise direction in the example shown in FIG. 10). In addition, the rotation speed of the blades 42 is decided in accordance with the amount of the generated scum S and the character and the like of the scum S.

The scum S discharged to the scum pit 3 by the rake mechanism 40a has a water-content remarkably lower than that of the scum S discharged along with the water flow shown in FIG. 1 to FIG. 3, so that the following scum treatment (sludge treatment) can be carried out advantageously. Moreover, in FIG. 10 and FIGS. 11 and 12 described below, it is configured to supply the air to the scum S using the stationary mixer 30 in order to prevent decay of the scum S which is stored in the scum pit 3. That is, in the scum pit 3, on a route of circulating the scum S using a pump $P_1$, the stationary mixer 30 to which the compressed air is supplied similarly to that shown in FIG. 8 described above is provided. In addition, The pump P1 can be used concurrently also as the underwater pump P sending the scum S to the scum treatment facility by providing a branch pipe with a valve.

The scum S stored in the scum pit 3 can be utilized as pretreatment equipment for volume reduction treatment of sludge if the air is supplied using the stationary mixer 30; accordingly, in a sewage treatment plant applying a volume reduction facility of sludge, it is easy to incorporate the scum pit 3 in the volume reduction facility.

Figure 11:
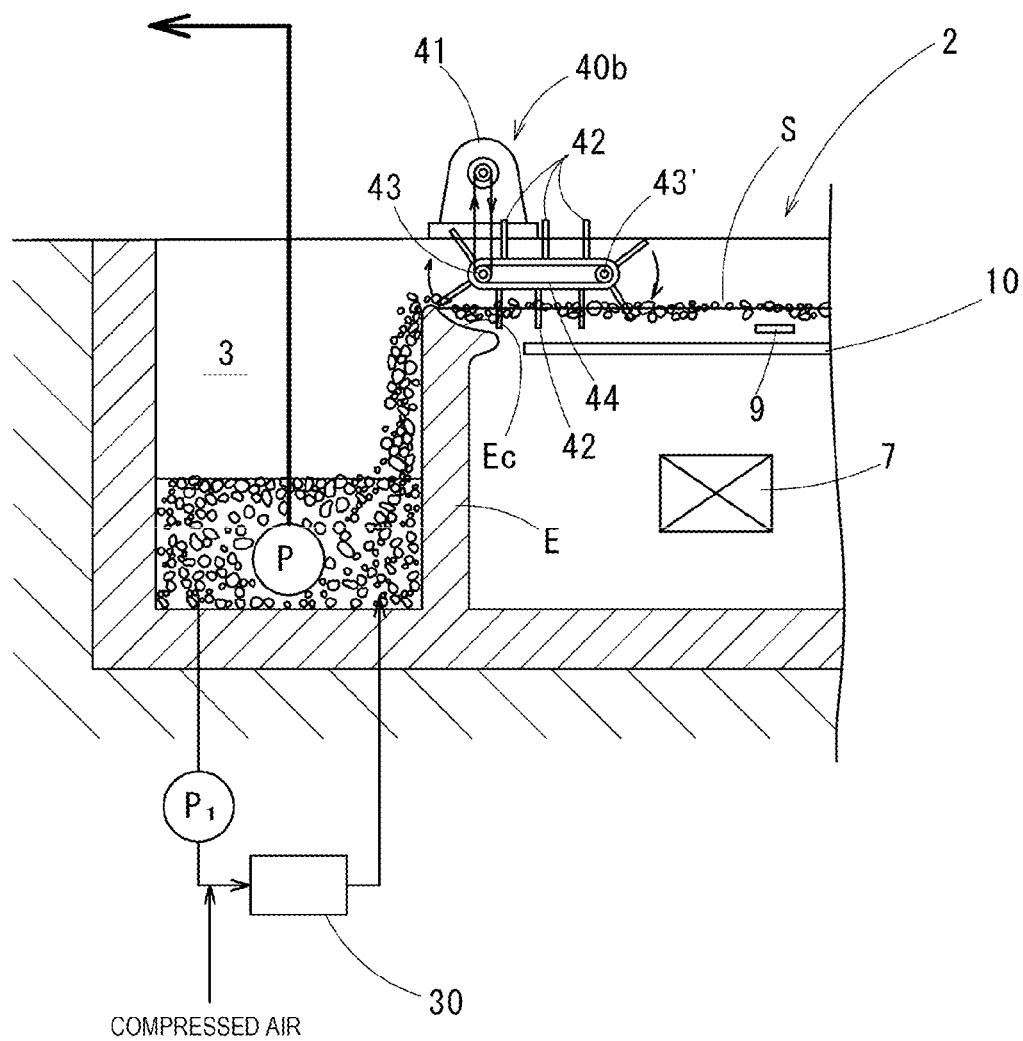
FIG. 11 It is a structure view of yet another style of the scum removing means.

FIG. 11 shows an example in which the scum removing means is configured by a rake mechanism 40b which is different from FIG. 10. A shape of an upper surface Ec at the headrace body 2 side of the wall E in which the rake mechanism 40b is provided shows a shape slightly extended to an upstream side (right side in the illustrated example) of the raw water from the above-described rake mechanism 40a. The other configuration of the upper surface Ec is the same as in FIG. 10. In the rake mechanism 40b, the same reference symbols are added to the same elements in the rake mechanism 40a, so that configuration element with different reference symbols will be described.

A driven rotation shaft 43' is provided at a height position as the rotation shaft 43 at a predetermined distance at the upstream side (right side in the illustrated example shown in FIG. 11) of the raw water from the position of the rotation shaft 43 in the horizontal direction. Moreover, an axis direction of the driven rotation shaft 43' is disposed parallel to the axis direction of the rotation shaft 43 and provided between the side walls 5 of the headrace body 2 which faces to each other. Near both side walls 5 of both shafts 43 and 43', sprockets are provided though they are not illustrated; and chains 44 are hanged on those sprockets respectively. Between the chains 44, a plurality (ten in the illustrated example) of blades 42 are provided with a predetermined intervals to each other in an orthogonal direction to both side walls 5 and both chains 44 and parallel in a straight part of the chains 44 with an equal interval. In addition, the distance between the shafts 43 and 43' and the number of the blades 42 are decided by an amount of the generated scum S, the character of the scum S, and the like.

The rake mechanism 40b formed of the above-described configuration can discharge the scum S to the scum pit 3 by moving the blade 42 at the lower side from the upstream side to the scum pit 3 side when the moved blade 42 rotates at the upper surface Ec of the wall E (rotation in the clockwise direction in the illustrated example). In the rake mechanism 40b, since the scum S of a broad area can be mechanically raked up, there is an advantage enabling to efficiently remove the scum.

In addition, the shape of the upper surface Eb of the wall E shown in FIG. 10 and the shape of the upper surface Ec of the wall E shown in FIG. 11 are made so that respective wall structures follow the shape of rotation tracks of tip ends of the blades 42; however, it may be applicable that these upper surfaces 3b and 3c are normal shapes shown in FIG. 1 and FIG. 2 and a guide plate is provided.

Figure 12:
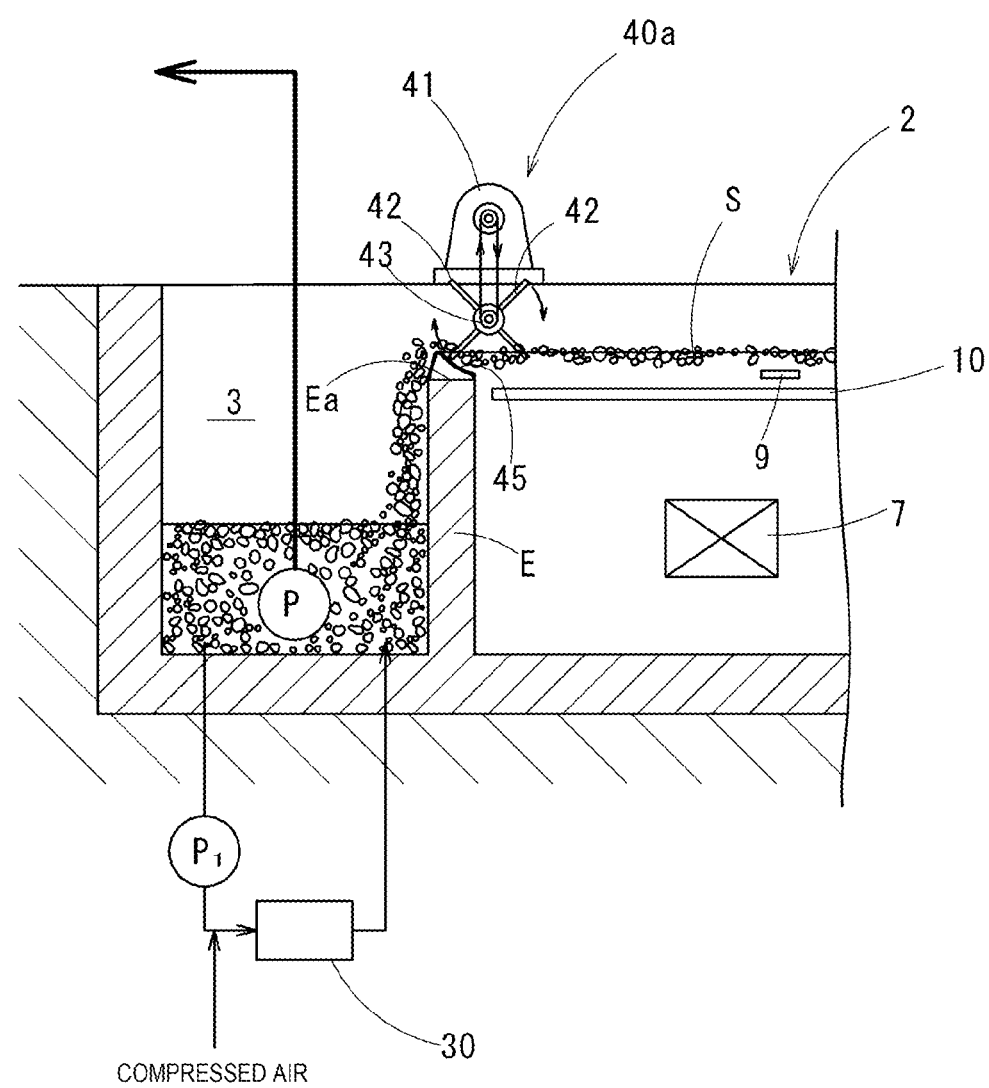
FIG. 12 It is a structure view in which an information plate is provided on the scum removing means shown in FIG. 10.

FIG. 12 shows an example in which a guide plate 45 is provided in the scum removing means shown in FIG. 10. The guide plate 45 is made of a plate material such as SUS or the like, fixed on the wall E between the headrace body 2 and the scum pit 3 so that an upper surface is formed into a curved surface following the rotation track of the tip end of the blades 42. Accordingly, the scum S sent out by the blades 42 can be introduced to the scum pit 3. When this guide plate 45 is used, there is an advantage in that the rake mechanism can be provided without modifying the shape of the upper wall surface of the scum pit 3 adjacent to the headrace body 2.

The headrace system according to the present invention is described with drawings as above; however, a specific configuration is not limited to the above-described embodiments, design changes and the like may be made without departing from the purport of the present invention.

Specifically, although the sedimentation basin distributing and supplying the raw water to the primary sedimentation basin (it is sometimes called as a first sedimentation basin) is applied to the headrace in the examples shown in the above-described explanation, it may be a case in which the raw water is supplied to a final sedimentation basin (it is sometimes called as a second sedimentation basin). Accordingly, in the present invention, a water channel supplying the raw water to the final sedimentation basin must be understood to have the same meanings as the headrace body in the present invention.

In the present invention, although the raw water is sewage water, the character thereof does not matter if the raw water includes buoyance scum.

Accordingly, it may be various industrial waste water.

INDUSTRIAL APPLICABILITY

In a headrace body, it is possible to remove a larger amount of scum, and utilize a headrace for supplying raw water to a sedimentation basin and also as a pretreatment equipment in facilities such as the subsequent sedimentation basin and a reaction chamber to reduce a load of the subsequent facilities; accordingly, it is possible to contribute to reduce energy in a whole of the sewage treatment plant as a result and contribute to an environment problem.

REFERENCE SIGNS LIST

1 Headrace system
2 Headrace body
3 Scum pit
E Wall
Ea, Eb, Ec Upper surface
4 Movable gate (Scum removing means)
4a Gate plate
4b Driving mechanism
5 Side wall
6 Sedimentation basin
7 Inflow port
8 Over-water nozzle (Scum removing means)
8a Water supply tube
8b Nozzle part
9 Underwater nozzle (Scum removing means)
10 Jetting mechanism (Scum removing means)
20, 20', 20" Buoyant imparting means
21 Pump
22 Ejector
22a Drive port
22b Discharge port
22c Suction port
23, 23a, 23b, 23c Perforated pipe
30 Stationary mixer
31 Ejector
31a Drive port
31b Discharge port
31c Suck port
32 Check valve
33 Regulator valve
40a, 40b Rake mechanism (Scum removing means)
41 Motor
42 Blade
43 Rotation shaft
43' Driven rotation shaft
44 Chain
45 Guide plate
S Scum (Scum layer)
P Underwater pump
$P_1$ Pump

The invention claimed is:

1. A headrace system supplying raw water to a plurality of sedimentation basin provided at a sewage-treatment plant, comprising:

a headrace body into which the raw water flows and which has a side wall along a flow direction of the raw water, a buoyant imparting means provided on a bottom part of the headrace body, along a direction perpendicular to the flow direction of the raw water at a side to which raw water of the headrace body to which raw water is flowed in, to impart buoyancy to solid matters included in the raw water; and a scum removing means that removes scum floating on a water surface of the headrace body from the headrace body and discharges to a scum pit arranged continuously to the headrace body, wherein the buoyant imparting means have a perforated pipe that release air bubbles into the raw water, the scum removing means have a compressed-air jetting mechanism that is provided inside a side wall along a longitudinal direction of the headrace body into which the raw water flows and at a position below a scum layer generated in the headrace body along the longitudinal direction of the headrace body, and jets compressed air from a plurality of portions in the longitudinal direction of the headrace body, and a gate that opens and closes between the headrace body and the scum pit, wherein the plurality of sedimentation basins is disposed side by side in the longitudinal direction of the headrace body, inflow ports which communicate the headrace body and an inside of the sedimentation basins, are provided on a side wall of the headrace body, and the compressed-air jetting mechanism is disposed above the inflow ports.

2. The headrace system according to claim 1 wherein the buoyant imparting means supplies minute bubbles to the raw water.

3. The headrace system according to claim 2, wherein the supply of the minute bubbles to the raw water is performed by generating water in which air is mixed through an ejector or a stationary mixer and supplying an air-mixed water.

4. The headrace system according to claim 1, wherein the scum removing means has an over-water nozzle jetting pressure water to an upper surface of the scum layer to advance a flow so that the scum layer goes toward the scum pit.

5. The headrace system according to claim 1, wherein the scum removing means has an underwater nozzle jetting pressure water in water to advance a flow so that the scum layer goes toward the scum pit.

6. The headrace system according to claim 1, wherein the scum removing means has a rake mechanism gathering scum and discharging to the scum pit.

* * * * *